May 14, 1957   G. W. ABBOTT   2,792,136
BALE LOADING ATTACHMENT FOR VEHICLES
Filed Sept. 13, 1955   4 Sheets-Sheet 1

INVENTOR.
GLENN W. ABBOTT
BY
McMorrow, Berman + Davidson
ATTORNEYS

May 14, 1957 G. W. ABBOTT 2,792,136
BALE LOADING ATTACHMENT FOR VEHICLES
Filed Sept. 13, 1955 4 Sheets-Sheet 2

INVENTOR
GLENN W. ABBOTT

BY
McMorrow, Berman + Davidson
ATTORNEYS

May 14, 1957 G. W. ABBOTT 2,792,136
BALE LOADING ATTACHMENT FOR VEHICLES
Filed Sept. 13, 1955 4 Sheets-Sheet 3

INVENTOR
GLENN W. ABBOTT

BY McMorrow, Berman + Davidson
ATTORNEYS

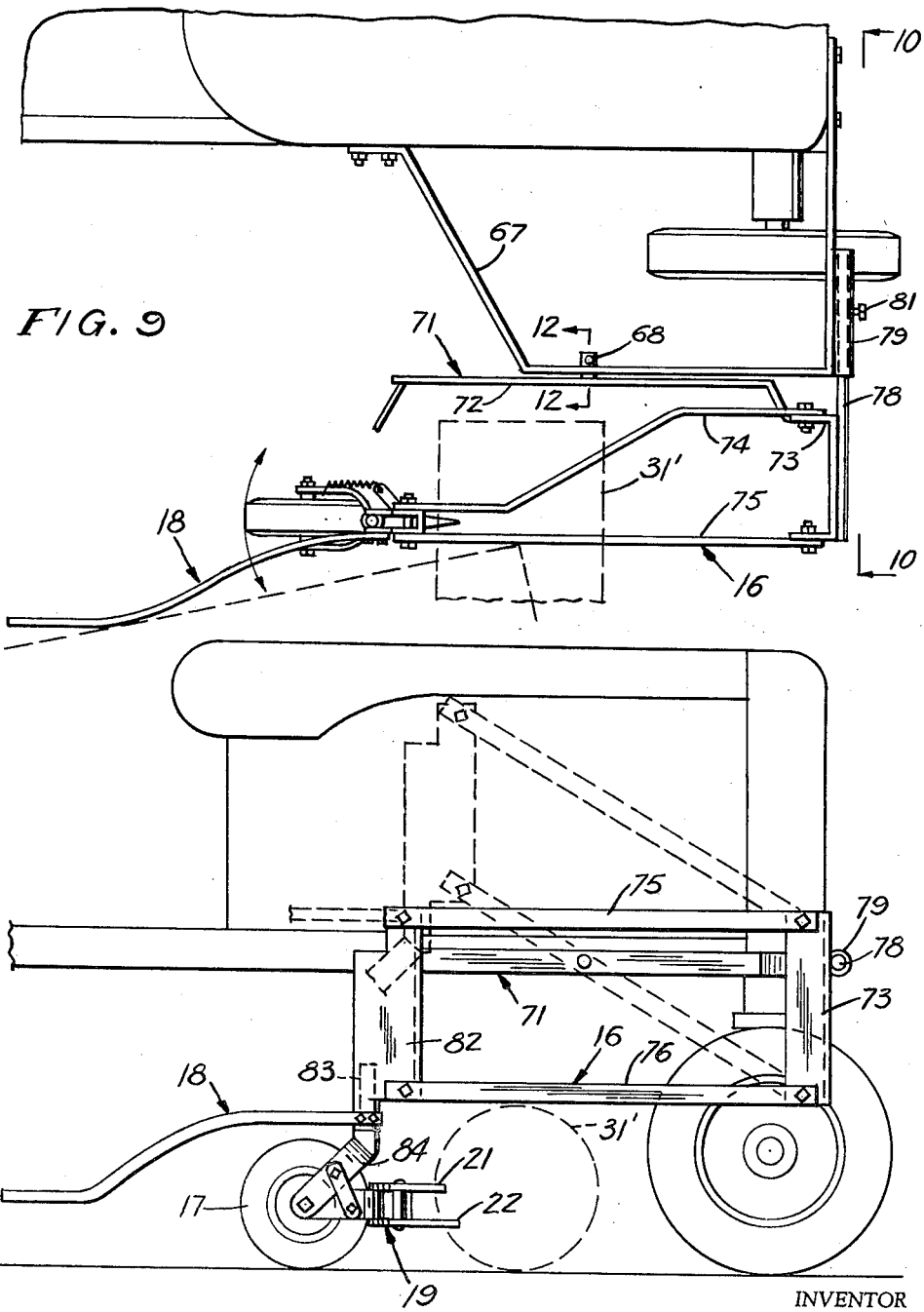

United States Patent Office 2,792,136
Patented May 14, 1957

2,792,136

BALE LOADING ATTACHMENT FOR VEHICLES

Glenn W. Abbott, Browning, Mo.

Application September 13, 1955, Serial No. 533,929

3 Claims. (Cl. 214—78)

The present invention relates to farming implements and specifically to an apparatus for transporting bales from a ground surface to a mobile supporting platform.

An object of the present invention is to provide an apparatus for transporting bales from a ground surface to a mobile supporting platform which enables the user to clear a field of bales resting upon the ground surface without manually positioning the bales upon the ground.

Another object of the present invention is to provide an apparatus for transporting bales from a ground surface to a mobile supporting platform which enables the user to quickly and efficiently clear a field of bales resting upon the ground surface and lying in any angular position.

A further object of the present invention is to provide an apparatus for transporting bales from a ground surface to a mobile supporting platform which is simple in structure, one easily attached and detached to a tractor and wagon or other towing vehicle and mobile supporting platform, and one which is sturdily constructed and may be easily manufactured and assembled.

Figure 1:
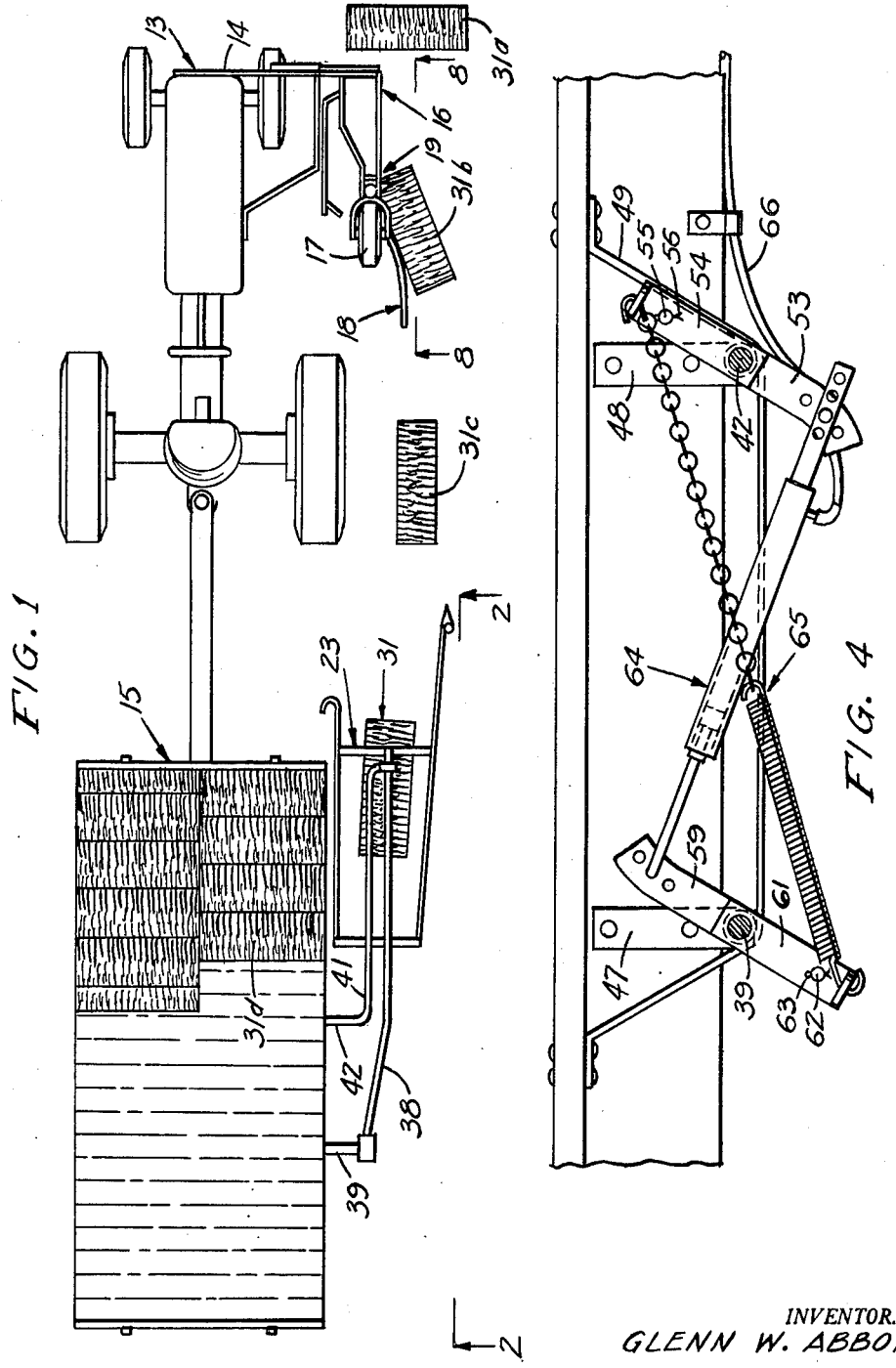
Figure 2:
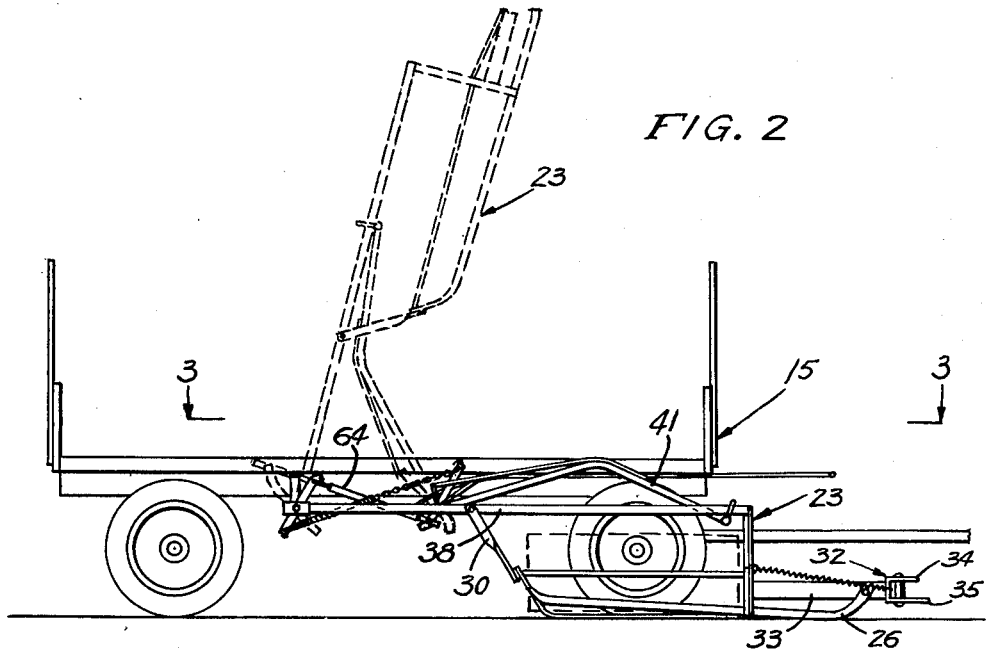
Figure 3:
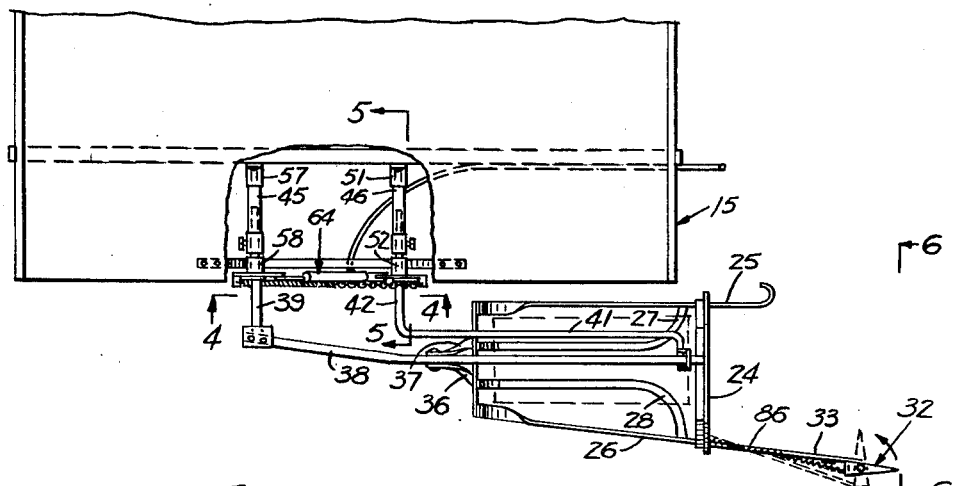
Figure 5:
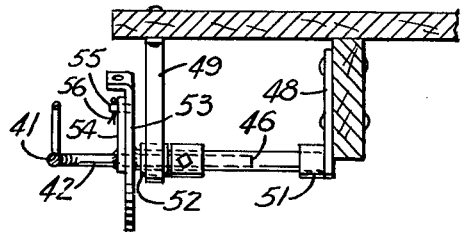
Figure 6:
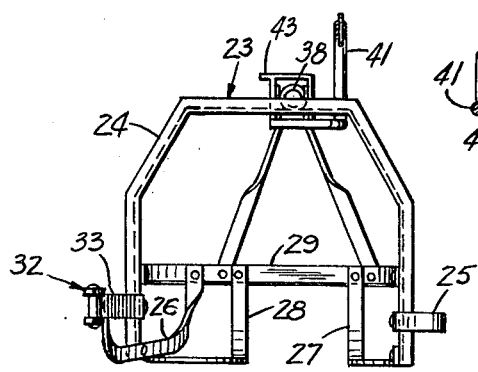
Figure 7:
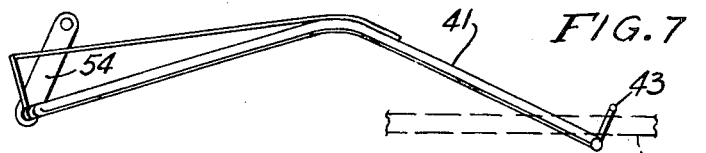
Figure 12:
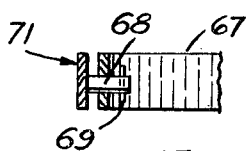
Figure 11:
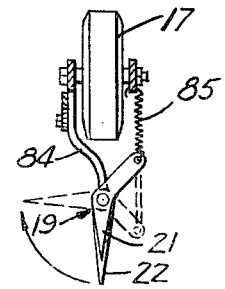
Figure 10:
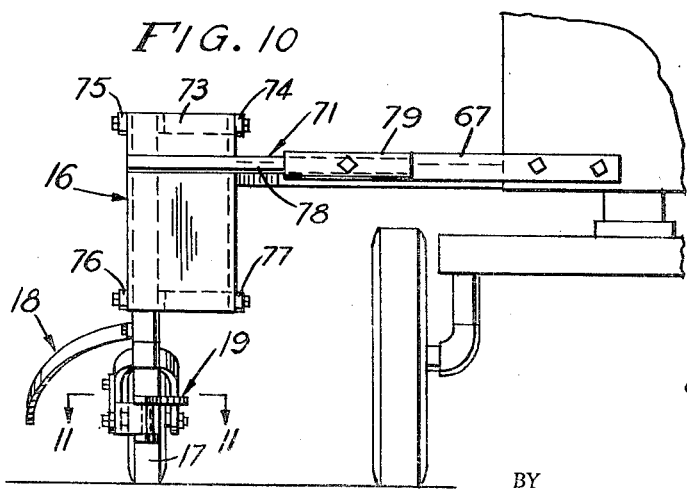

These and other objects and advantages of the present invention will be fully apparent from the following description when taken in connection with the annexed drawings, in which:

Figure 1 is a plan view of the apparatus of the present invention in operative position, with a plurality of bales supported upon the adjacent ground surface in process of being guided and fed into the cage, Figure 2 is an elevational view, on an enlarged scale, of the cage of the apparatus of Figure 1, the full line showing indicating the longitudinal position of the cage for receiving a bale and a dotted line showing indicating the cage in its elevated position, Figure 3 is a fragmentary plan view taken on the line 3—3 of Figure 2, with a portion of the platform floor broken away to show the structure operatively connected to the cage, Figure 4 is a fragmentary view, on an enlarged scale, taken on the line 4—4 of Figure 3, Figure 5 is a fragmentary sectional view, on an enlarged scale, taken on the line 5—5 of Figure 3, Figure 6 is a fragmentary view, on an enlarged scale, taken on the line 6—6 of Figure 3, Figure 7 is a detailed view, on an enlarged scale, of a portion of the lifting mechanism for the cage, Figure 8 is an elevational view, on an enlarged scale, of the bale-feeding and directing means of the apparatus of Figure 1, Figure 9 is a plan view of the assembly of Figure 8, Figure 10 is a fragmentary view taken on the line 10—10 of Figure 9, Figure 11 is a fragmentary view taken on the line 11—11 of Figure 10, the full line showing indicating the bale-contacting element in operative position and the dotted line showing indicating the position of the bale-contacting element after it has been engaged by a bale, and Figure 12 is a fragmentary sectional view, on an enlarged scale, taken on the line 12—12 of Figure 9.

Referring in greater detail to the drawings, in which like numerals indicate like parts throughout the several views, the apparatus of the present invention for transporting bales from a ground surface to a mobile supporting platform comprises a tractor 13, constituting a towing vehicle and having a frame 14, a wagon 15, constituting a mobile supporting platform, arranged in tandem relation with respect to the tractor 13 and connected to the tractor 13 for movement with the latter. A feeding frame 16 having a wheel 17 is positioned on one side of the tractor frame 14 with the wheel 17 parallel to and spaced from the tractor frame 14. A bale-directing and guiding element 18 is positioned outwardly of the feeding frame wheel 17 and extends longitudinally backwardly from the wheel 17. The bale-directing and guiding element 18 is shown in Figures 8 and 9 and embodies an outwardly and downwardly curved bar fixedly secured by one end to the feeding frame 16 adjacent to and above the wheel 17. A bale-contacting element 19 is positioned forwardly of and projects longitudinally with respect to the feeding frame wheel 17 for engaging a bale lying on the ground surface and directing the same into engagement with the bale-directing and guiding element 18, the bale-contacting element 19 embodying a pair of horizontally-disposed prongs 21 and 22 arranged in vertical spaced relation and mounted upon the feeding frame 16 forwardly of the wheel 17 for limited swinging movement from the longitudinally projecting position to a position projecting outwardly from the feeding frame 16.

The apparatus also includes a horizontally-disposed cage 23 having its forward end open positioned on the same side of the wagon 15 as that on which the feeding frame 16 is positioned and in longitudinal alignment with the feeding frame 16 and with the open end facing toward the feeding frame 16 and connected to the wagon for swinging movement from the longitudinal position to an elevated position above the wagon. The cage 23 is shown in detail in Figures 2, 3, and 6, and is seen to consist in an inverted U-shaped frame member 24, a horizontally-disposed inner guide member 25, and a horizontally-disposed outer guide member 26 fixedly secured intermediate their ends to the frame member 24 and spaced above the ground. The cage 23 includes a pair of runners 27 and 28 extending from the cage bottom member 29 forwardly in spaced relation with respect to each other and with respect to the guide members 25 and 26, respectively. The cage is open on its side having the guide member 25 and the runner 27 and when the cage is in its elevated position, shown in dotted lines in Figure 2, a bale, such as is shown in Figure 1, designated by the reference numeral 31, may be discharged from the cage 23 on to the floor of the wagon 15. A bale-directing device designated by the reference numeral 32 in Figures 2 and 3 projects from the forward end of a guide bar 33 attached to the cage 23 and consists in a pair of horizontally-disposed prongs 34 and 35 arranged in vertical spaced relation and mounted upon the end of the guide bar 33 for limited movement about a vertical axis from the full line position shown in Figure 3 to the dotted line position and from their forwardly directed position to a position facing the wagon 15. Braces 36 and 37 connect the cage bottom member 29 to a main arm 38 intermediate its ends, the forward end of the main arm 38 being fixedly secured to the bight of the frame member 24 and the rearward end of the main arm 38 is fixedly secured to a shaft 39 which is arranged transversely of the main arm 38. An auxiliary arm 41 is arranged longitudinally of and parallel to the main arm 38 and has its rearward end bent to form another shaft 42 positioned parallel to and spaced forwardly of the shaft 39. The forward end of the auxiliary arm 41 is bent outwardly and carries an inverted U-shaped guide 43 surrounding the adjacent portion of the main arm 38 for sliding movement therealong.

The means by which the arms 38 and 41 are connected to the frame 44 of the wagon 15 is illustrated in Figures 1 to 5, inclusive, and Figure 12 and consists in a hollow tubular member 45 receiving the shaft 39 and a hollow tubular member 46 receiving the shaft 42. The tubular members 45 and 46 are arranged transversely of the frame of the wagon 15 and are secured thereto by bars 47 and 48, respectively, and a strap 49, as shown in Figure 4. The tubular member 46 is supported for rotation in bearings 51 and 52, as seen in Figure 5, and has fixedly secured to its end which is outwardly of the bearing 52 a lever 53. An arm 54 fixedly secured to the shaft 42 has a hole receiving a pin 55 which projects perpendicularly from the lever 53 intermediate the ends of the latter and a cotter pin 56 secures the arm 54 in face to face abutting relation with respect to the lever 53 when the shaft 42 is received within the tubular member 46. The tubular member 45 is similarly supported in bearings 57 and 58 and has a lever 59 on its end which is adjacent to the bearing 58. An arm 61 is fixedly secured to the shaft 39 and projects downwardly and in face to face abutting relation with respect to the lower end of the lever 59 when the shaft 39 is received within the tubular member 45. A pin 62 projecting from the lever 59 intermediate the ends of the latter is received in a hole in the arm 61 and is secured in the hole by means of a similar cotter pin 63.

A hydraulic cylinder assembly 64 connects the upper end of the lever 59 to the lower end of the lever 53 and a spring and chain assembly 65 connects the lower end of the lever 59 to the upper end of the lever 53, as seen in Figure 4. A flexible hose 66 connects the hydraulic cylinder assembly 64 to a source of fluid power on the tractor 13.

Referring to Figures 8 to 12, inclusive, the construction of the feeding frame 16 is seen to consist in a fixed generally U-shaped bar 67 arranged horizontally with its legs bolted to the tractor frame 14 and having a hole in its bight receiving (Figure 12) a pivot pin 68. A cotter key 69 receivable in a hole in the pivot pin 68 secures the detachable portion 71 of the feeding frame to the bar 67.

The detachable portion 71 of the feeding frame 16 includes a horizontally-disposed bar 72 arranged parallel to the bight of the bar 67 and connected thereto by the pivot pin 68, the forward end of the bar 72 supporting a channel-shaped member 73 the flanges of which are pivotally connected to the forward ends of the upper frame members 74 and 75 on the forward ends of the lower frame members 76 and 77. A horizontally-disposed shaft 78 is welded or otherwise secured to the web of the channel-shaped member 73 at a point spaced from the upper end of the latter and extends outwardly from the side of the channel-shaped member 73 adjacent the tractor 13 and is received in a tubular member 79 welded or otherwise fixed to the forward one of the legs of the U-shaped bar 67. A bolt 81 extending through a tap hole in a tubular member 79 forms a means of locking the shaft 78 against longitudinal movement with respect to the tubular member 79.

Another channel-shaped member 82 connects the rearward ends of the upper frame members 74 and 75 and the rearward ends of the lower frame members 76 and 77 and also dependingly carries for rotary movement the shaft 83 which projects upwardly from the frame 84 carrying the sheeting frame wheel 17. The bale-contacting element 19 is carried by the wheel-supporting frame 84.

Referring to Figure 8, it will be seen that the pivotal connection of the upper frame members 74 and 75 and the lower frame members 76 and 77 to the member 73 permits the movement from the full line position to the dotted line position whenever the wheel 17 should strike an obstruction.

Referring to Figure 11, it will be seen that a spring 85 biases the prongs 21 and 22 to the forwardly-directed position, the dotted line position of the prongs 21 and 22 in that figure illustrating the extent of their movement when they have engaged the bale and turned the same, the bale being shown in Figures 1 and 2 in dotted lines and indicated by the reference numeral 31'. A similar spring 86 biases the bale-contacting device 32 to its forward position as shown in Figure 3 and permits the swinging movement of the bale-contacting device to the dotted line position shown in that figure and toward the wagon 15.

In use, as shown diagrammatically in Figure 1, the tractor 13 which constitutes a towing vehicle tows the wagon 15 constituting a mobile supporting platform across the ground surface upon which rests a series of bales of hay, straw, or other farm crop, positioned at various angles to the line of movement to the tractor 13 and the wagon 15. In Figure 1, a bale, indicated by the reference numeral 31a is about to be contacted by the feeding frame 16, a bale 31b is shown after being contacted and turned from the position of the bale 31a towards a longitudinal position indicated by the position of the bale 31c which follows and has already been turned by the feeding frame 16 and the bale-directing and guiding element 18 and the bale-contacting element 19. A bale 31 is seen in position about to be received within the cage 23 in which it will be lifted, by the action of the hydraulic cylinder assembly when fluid is admitted thereto, to an elevated position above the wagon 15 for storage thereon, the stored bales being indicated generally by the reference numeral 31d.

What is claimed is:

1. Apparatus for transporting bales from a ground surface to a mobile supporting platform comprising a towing vehicle including a frame, a mobile supporting platform arranged in tandem relation with respect to said vehicle and connected to the towing vehicle for movement with the latter, a feeding frame having a wheel positioned on one side of said vehicle frame with the wheel parallel to and spaced from the vehicle frame, a bale-directing and guiding element positioned outwardly of said feeding frame wheel and extending longitudinally backwardly from the latter-named wheel, a bale-contacting element positioned forwardly of and projecting longitudinally with respect to said feeding frame wheel for engaging a bale lying on a ground surface and directing same into engagement with said bale-directing and guiding element, a horizontally-disposed cage having one end open positioned on the same side of said platform as that on which the feeding frame is positioned and in longitudinal alignment with said feeding frame with the open end facing towards the feeding frame and connected to said platform for swinging movement from the longitudinal position to an elevated position above said platform, a bale directing device projecting from the open end of said cage and including a guide bar projecting from the open end of said cage and a pair of horizontally disposed prongs arranged in vertical spaced relation and mounted on the forward end of said guide bar for limited movement about a vertical axis, the inner side of said cage being open for permitting the discharge of a bale from the cage on to said platform when the cage has been moved to its elevated position.

2. Apparatus for transporting bales from a ground surface to a mobile supporting platform comprising a towing vehicle including a frame, a mobile supporting platform arranged in tandem relation with respect to said vehicle and connected to the towing vehicle for movement with the latter, a feeding frame having a wheel positioned on one side of said vehicle frame with the wheel parallel to and spaced from the vehicle frame, a bale-directing and guiding element positioned outwardly of said feeding frame wheel and extending longitudinally backwardly from the latter-named wheel, a bale-contacting element positioned forwardly of and projecting longitudinally with respect to said feeding frame wheel for engaging a bale lying on a ground surface and directing same into engagement with said bale-directing and guiding element, a horizontally-disposed cage having one end open positioned on the same side of said platform as that on which the feeding frame is positioned and in longitudinal alignment with said feeding frame with the open end facing towards the feeding frame and connected to said platform for swinging movement from the longitudinal position to an elevated position above said platform, a bale directing device projecting from the open end of said cage and including a guide bar projecting from the open end of said cage and a pair of horizontally disposed prongs arranged in vertical spaced relation and mounted on the forward end of said guide bar for limited movement about a vertical axis, the inner side of said cage being open for permitting the discharge of a bale from the cage on to said platform when the cage has been moved to its elevated position, and means for effecting the movement of said cage.

3. Apparatus for transporting bales from a ground surface to a mobile supporting platform comprising a towing vehicle including a frame, a mobile supporting platform arranged in tandem relation with respect to said vehicle and connected to the vehicle for movement with the latter, a feeding frame having a wheel positioned on one side of said vehicle frame with the wheel parallel to and spaced from the vehicle frame, a bale-directing and guiding element positioned outwardly of said feeding frame wheel and extending longitudinally backwardly from the latter-named wheel, a bale-contacting element positioned forwardly of and projecting longitudinally with respect to said feeding frame wheel for engaging a bale lying on a ground surface and directing same into engagement with said bale-directing and guiding element, and a horizontally-disposed cage having one end open positioned on the same side of said platform as that on which the feeding frame is positioned and in longitudinal alignment with said feeding frame with the open end facing toward said feeding frame and connected to said platform for swinging movement from the longitudinal position to an elevated position above said platform, the inner side of said cage being open for permitting the discharge of a bale from the cage on to said platform when the cage has been moved to its elevated position, said bale-contacting element embodying a pair of horizontally-disposed prongs arranged in vertical spaced relation and mounted on said feeding frame for limited swinging movement from the longitudinally-projecting position to a position projecting outwardly from said feeding frame.

References Cited in the file of this patent
UNITED STATES PATENTS

| | | |
|---|---|---|
| 2,225,787 | McDermott et al. | Dec. 24, 1940 |
| 2,543,302 | Rossiter | Feb. 27, 1951 |
| 2,597,218 | Appel | May 20, 1952 |
| 2,634,003 | Williamson et al. | Apr. 7, 1953 |
| 2,675,116 | Collins | Apr. 13, 1954 |
| 2,690,851 | Johnson | Oct. 5, 1954 |
| 2,704,164 | David | Mar. 15, 1955 |
| 2,733,821 | Willrodt | Feb. 7, 1956 |
| 2,772,793 | Brusewitz | Dec. 4, 1956 |